Aug. 12, 1958 W. T. TAYLOR 2,847,288
CARBURETING MEANS
Filed July 30, 1956 2 Sheets-Sheet 1

INVENTOR,
WILLIAM T. TAYLOR
BY
Weatherford & Weatherford
Attys

Aug. 12, 1958    W. T. TAYLOR    2,847,288
CARBURETING MEANS
Filed July 30, 1956    2 Sheets-Sheet 2

INVENTOR,
WILLIAM T. TAYLOR
BY
Weatherford & Weatherford
attys

United States Patent Office 2,847,288
Patented Aug. 12, 1958

2,847,288

CARBURETING MEANS

William T. Taylor, Marks, Miss.

Application July 30, 1956, Serial No. 600,785

15 Claims. (Cl. 48—180)

This invention relates to certain new and useful improvements in carburetors for use in internal combustion engines, and is a continuation-in-part of my copending application Serial No. 529,209, now abandoned.

It is contemplated in the present invention that a carburetor be provided which is particularly adapted for use in internal combustion engines using gaseous fuel as of the character of propane-butane or the like converted from the liquid petroleum state.

It is further contemplated that such a carburetor be provided having an improved means for injecting fuel into the air supply. Said means includes a butterfly valve carried by a hollow shaft rotatably mounted in the air intake pipe, said shaft being separated into two passageways by baffle means, which passageways extend longitudinally of the shaft and serve as separate conduits for the fuel, and fuel discharge apertures in the upper and lower sides of said shaft opening from said passageways into said air intake pipe adjacent opposite sides of said butterfly valve. Additionally, said means includes novel fuel control means for controlling the amount of fuel introduced into said air intake pipe adjacent opposite sides of said butterfly valve, said fuel control means being interconnected with said butterfly valve and so constructed that fuel is delivered to the air intake pipe from the apertures on the downstream side of said butterfly valve during the first phase of the opening of the butterfly valve and delivered from both the upstream side and the downstream side during the remaining phase of operation, whereby adequate fuel delivery is insured under increased load conditions.

The principal object of the present invention is to provide an improved carburetor adapted for use with a gaseous fuel.

A further object is to provide such a carburetor having a hollow shaft divided into two passageways, said shaft serving the dual purpose of providing a mounting for the fuel and air valves and providing means for injecting fuel into the air stream adjacent both the upstream and downstream sides of the butterfly valve through said passageways.

A further object is to provide means for controlling the fuel flow through said passageways, said means being interconnected with the butterfly valve for conjoint control of the fuel and air.

A further object is to inject the fuel into the air stream adjacent the downstream side of the butterfly valve during the initial phases of operation of the carburetor and additionally to inject the fuel into the air stream adjacent the upstream side of the butterfly valve as the upstream side is turned in a downstream direction during the remaining phases of the operation of the carburetor whereby adequate fuel flow is insured under increased load conditions.

A further object is to improve generally the design and construction of carbureting means.

The means by which the foregoing and other objects of the present invention are accomplished and the manner of their accomplishment will be readily understood from the following specification upon reference to the accompanying drawings, in which:

Fig. 3 is a sectional view taken as on the line III—III of Fig. 2 illustrating the butterfly valve in the closed position.

Fig. 4 is a sectional view taken as on the line IV—IV of Fig. 2 illustrating the position of the auxiliary valve plate when the butterfly valve is in the position shown in Fig. 3.

Fig. 5 is a sectional view taken as on the line V—V of Fig. 2 illustrating the position of the main valve plate when the butterfly valve is in the position illustrated in Fig. 3.

Fig. 6 is a sectional view similar to Fig. 3 illustrating the butterfly valve in an intermediate position in which the butterfly valve is in substantially one-half open position.

Fig. 7 is a sectional view similar to Fig. 4 illustrating the position of the auxiliary valve plate when the butterfly valve is in the position illustrated in Fig. 6.

Fig. 8 is a sectional view similar to Fig. 5 illustrating the position of the main valve plate when the butterfly valve is in the position illustrated in Fig. 6.

Fig. 9 is a sectional view similar to Fig. 3 illustrating the butterfly valve in substantially fully opened position.

Fig. 10 is a sectional view similar to Fig. 4 illustrating the position of the auxiliary valve plate when the butterfly valve is in the position illustrated in Fig. 9.

Fig. 11 is a sectional view similar to Fig. 5 illustrating the position of the main valve plate when the butterfly valve is in the position illustrated in Fig. 9.

Fig. 12 is a fragmentary sectional view taken as on the line XII—XII of Fig. 2.

Figure 1:
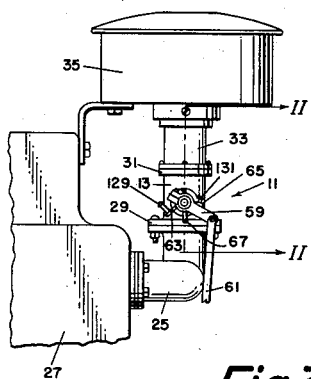
Fig. 1 is a fragmentary front elevational view illustrating the carburetor of the present invention as mounted on an engine.
Figure 2:
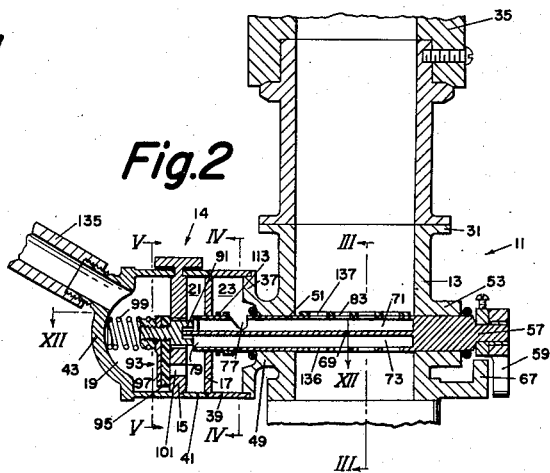
Fig. 2 is a fragmentary longitudinal section on an enlarged scale taken as on the line II—II of Fig. 1.

Referring now to the drawings in which the various parts are indicated by numerals, a carburetor 11 embodying the present invention comprises in general an air intake pipe 13 and a casing assembly 14 preferably removably supported thereby. Casing assembly 14 includes a first disc 15 and a second disc 17 which extend transversely of the casing assembly and are longitudinally spaced apart. Discs 15, 17 divide the casing assembly into a header fuel chamber 19, an intermediate fuel chamber 21, and an auxiliary fuel chamber 23.

Carburetor 11 is adapted to be used with a conventional internal combustion engine. Thus Fig. 1 illustrates carburetor 11 mounted on an intake manifold 25 of an engine 27. As is shown, the lower end of air intake pipe 13 is provided with a lower flange 29 which is connected to a similar flange on the upper end of intake manifold 25 as by suitable bolt means. The upper end of air intake pipe 13 is provided with an upper flange 31 to which may be connected, as by suitable bolt means, a short pipe section 33. An air cleaner 35 may be mounted on the upper end of pipe section 33. Thus it will be seen that a conduit is provided for air passage from the outside atmosphere to engine 27, the air flowing into air cleaner 35 through pipe section 33, air intake pipe 13, intake manifold 25, and thence into engine 27.

Auxiliary fuel chamber 23 is defined at one end by a flange plate 37 and at the other end by the inward side of second disc 17. The cylindrical wall of auxiliary fuel chamber 23 is defined by an annular auxiliary casing 39 interposed between flange plate 37 and second disc 17. Intermediate fuel chamber 21 is defined at one end by the outward side of second disc 17 and at the other end by the inward side of first disc 15. The cylindrical wall of intermediate fuel chamber 21 is defined by an annular intermediate casing 41 interposed between first disc 15 and second disc 17. Header fuel chamber 19 is defined by a dome 43 and the outward side of first disc 15. Intermediate casing 41 includes projecting apertured ears 41A on opposite sides thereof and dome 43 includes similar apertured ears 43A indexed with ears 41A.

The casing assembly comprising auxiliary casing 39, second disc 17, intermediate casing 41, first disc 15, and dome 43, may be secured in assembled relationship by bolt means 45 which extend through the indexed apertures in ears 41A, 43A and are secured in internally threaded projections 47 supported from opposite sides of air pipe 13. Additionally, bolt means 45 provide the means for removably connecting said casing assembly to flange plate 37 which is supported from air intake pipe 13 by a hollow neck portion 49.

A hollow shaft 51 extends transversely through air intake pipe 13 and is rotatably journalled in the throat of neck portion 49 and in the throat of a neck portion 53 oppositely disposed in air pipe 13 from neck portion 49. One end of shaft 51 rotatably extends through the throat of neck portion 49, through auxiliary chamber 23, through an aperture 55 in second disc 17, into intermediate chamber 21 and terminates therein.

The end of shaft 51 opposite from the end terminating in intermediate chamber 21 is blocked off as at 57. This closed off end of the shaft extends exteriorly of air intake pipe 13 and a lever 59 is mounted thereon. The outer end of lever 59 is hingedly connected to one end of a link 61. The other end of link 61 is connected by suitable linkage to a conventional throttle pedal or the like whereby movement of said throttle pedal is effective to move lever 59 and rotate shaft 51. Suitable stop means, as stop lugs 63, 65, may be provided on shaft 51 which define the limits of rotation of the shaft in either direction upon engagement of lugs 63, 65 with a stop pin 67 carried by and extending from air pipe 13.

A baffle plate 69 extends longitudinally of the interior of hollow shaft 51 to divide the shaft into a longitudinally extending upper passageway 71 and a longitudinally extending lower passageway 73. Upper passageway 71 is blocked off as at 75 adjacent the end of shaft 51 which terminates in intermediate chamber 21. A portion of shaft 51 extending through auxiliary chamber 23 is cut-out as at 77 adjacent the upper passageway 71, whereby the upper passageway is in communication with and opens into auxiliary fuel chamber 23. The end of shaft 51 adjacent the lower passageway 73 is open as at 79 whereby intermediate chamber 21 is in communication with lower passageway 73.

A butterfly valve 81 is removably mounted on shaft 51. Butterfly valve 81 may be provided with a transverse offset concave portion 83 which embraces and engages one side of shaft 51 throughout substantially one-half the circumference of the shaft and may be removably attached thereto as by means of screws 85 extending through apertures in offset portion 83 and threadedly engaging hollow shaft 51. The diameter of butterfly valve 81 is preferably only slightly smaller than the inside diameter of air intake pipe 13.

A rib 87 is attached to and projects outwardly from the end of shaft 51 that terminates in intermediate fuel chamber 21. A preferably cylindrical stud 89 having a groove 91 in the end thereof removably fits on the end of shaft 51 with rib 87 extending into groove 91. Thus stud 89 forms a removable extension of shaft 51. Fixedly mounted on stud 89 in header fuel chamber 19 is a main valve plate 93. Valve plate 93 is preferably formed of carbon, as at 95, and having a metal backing 97 bonded thereto to provide strength to the carbon.

The inward face of the carbon 95 is held in face to face slidable engagement with the outer face of first disc 15 by means of a spring 99 which is interposed between the outer end of stud 89 and the end wall of dome 43. In addition to keeping the valve plate 93 in slidable engagement with the first disc 15 spring 99 keeps groove 91 in engagement with rib 87. It will be understood that by forming valve plate 93 of carbon a natural lubricating means is provided to reduce the friction between valve plate 93 and first disc 15. Disc 15, which, as described, is interposed between header fuel chamber 19 and intermediate fuel chamber 21, is provided with a fuel flow port or aperture 101 through which flow communication between chambers 19 and 21 is established, this flow communication being controlled by a shift of valve plate 93 which is disposed in sliding face engagement with disc 15, the fuel flow port being formed through disc 15 in a position to be covered and uncovered by relative swinging movement of the valve plate 93. Aperture 101 is preferably wedged shape as illustrated in the drawings. The upper side 103 of flow port 101 and the lower side 105 of flow port 101 are respectively preferably substantially arcuate and join at one of the ends thereof to form an apex 107 where the width of the aperture 101 is substantially zero. The sides 103, 105 extend divergingly away from apex 107 with the width of aperture 101 increasing along a major portion of the length thereof and thence decreasing to terminate at an end 109 joining the opposite ends of sides 103, 105, the end 109 being substantially perpendicular to the sides 101, 103, and along the end 109 the width of aperture 101 is substantially greater than the aperture width at or adjacent to apex 107. It thus will be seen that the width of aperture 101 increases from apex 107 towards end 109 throughout the major portion of its length and includes a terminal section in which the aperture width is reduced. It will be understood that it is not intended that the shape of aperture 101 be limited to that herein described, but the aperture may be of other shapes, as for example those illustrated in my copending application Serial Number 529,209.

Mounted on shaft 51 in auxiliary fuel chamber 23 is a second valve plate 111 having an aperture 113 provided therein through which shaft 51 extends. Second valve plate 111 is preferably formed of carbon as at 115 and has a metal backing 117 to provide strength to the carbon. A post 121 extending inwardly from second valve plate 111 is provided with a bifurcated end forming a guide slot 123 between the forks thereof through which slidably extends the distal end of a pin 125. Guide slot 123 is of sufficient depth to permit longitudinal movement of post 121 relative to pin 125. A spring 126, encasing post 121, is interposed between pin 125 and the back of valve plate 111 to hold the valve plate in face to face slidable engagement with the inward face of second disc 17. The end of pin 125 remote from said distal end thereof is secured to a ring 125A through which extends shaft 51. A set screw 125B extends through a threaded aperture in ring 125A to anchor the ring and pin 125 in any desired position on shaft 51. Thus it will be understood that pin 125 will pivot or swing with shaft 51 as an axis and by reason of the fact that the pin extends through slot 123 the pin will cause valve plate 111 to similarly swing in an arc with shaft 51. Additionally it will be understood that the angular position of valve plate 111 relative to shaft 51 may be adjusted by means of set screw 125B.

Disc 17, which, as described, is interposed between intermediate chamber 21 and auxiliary chamber 23, is provided with a fuel flow port or aperture 127 through which communication between chambers 21 and 23 is established, this flow communication being controlled by shift of valve plate 111 which is disposed in sliding face engagement with disc 17, the fuel flow port being formed through disc 17 in a position to be covered and uncovered by relative swinging movement of the valve plate 111. Aperture 127 may be of any desired shape, as for example the shape illustrated in the present drawings, which as will be seen is substantially a parallelogram.

Figure 3:
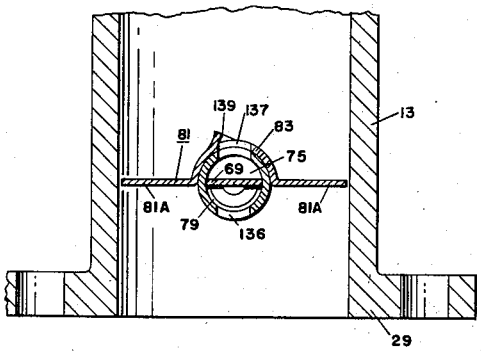
Figs. 3 through 12 are on a further enlarged scale.
Figure 4:
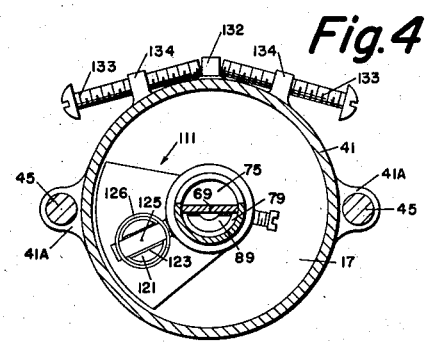
Figure 6:
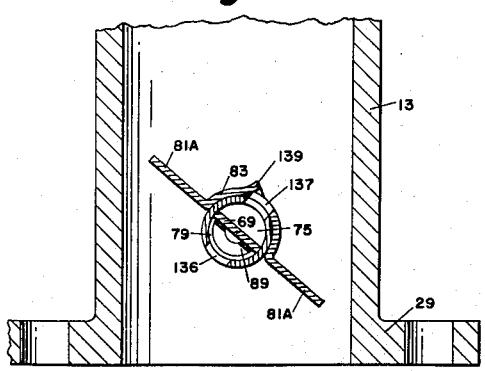
Figure 5:
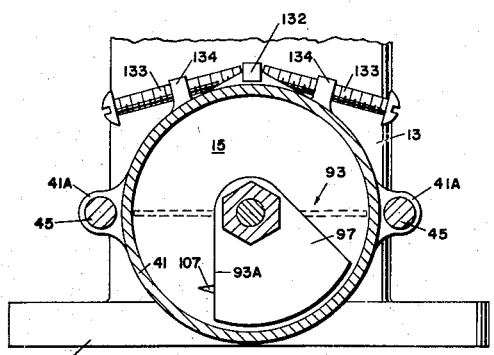
Figure 7:
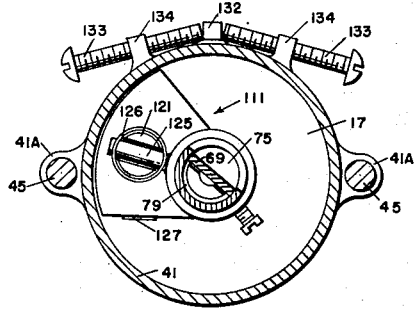
Figure 8:
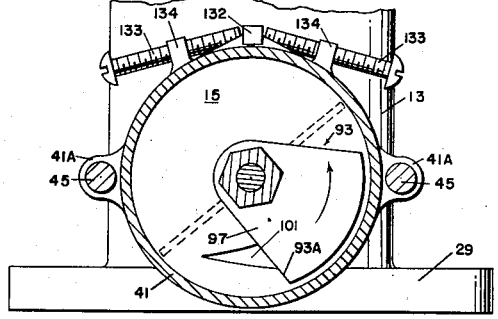
Figure 9:
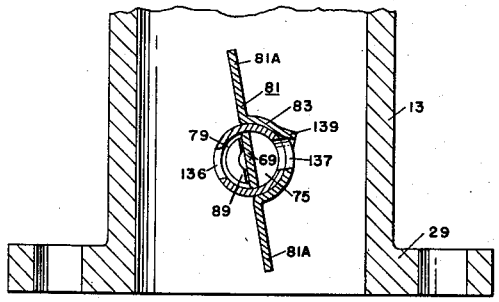
Figure 10:
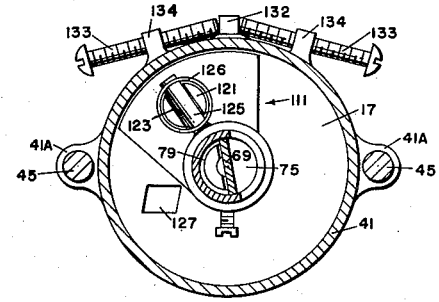
Figure 12:
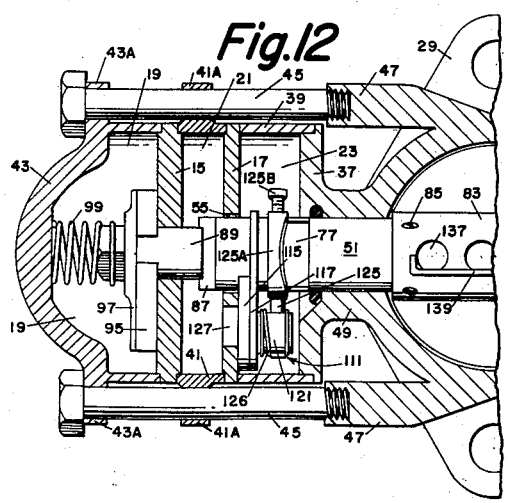
Figure 11:
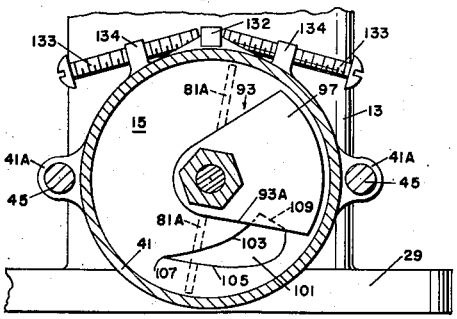

Butterfly valve 81, valve plate 93 and valve plate 111 are conjointly shifted by rotation of shaft 51 from and to the extreme positions illustrated in Figs. 3, 4 and 5, and to and from the other extreme positions illustrated in Figs. 9, 10 and 11. In Figs. 6, 7 and 8 are illustrated an intermediate position between the above mentioned extreme positions. Thus Fig. 3 illustrates butterfly valve 81 in the substantially closed throttle position. Figs 4 and 5 respectively illustrate the positions of auxiliary valve plate 111 and main valve plate 93 when butterfly valve 81 is in the position illustrated in Fig. 3. Fig. 6 illustrates butterfly valve 81 in an intermediate position in which the valve is in substantially one-half open position. Figs. 7 and 8 respectively illustrate the positions of auxiliary valve plate 111 and main valve plate 93 when the butterfly valve is in the position illustrated in Fig. 6. Thus it will be seen in Fig. 7 valve plate 111 is exposing a minor portion of aperture 127. Fig. 9 illustrates the butterfly valve 81 in the substantially full opened throttle position. Figs. 10 and 11 respectively illustrate the positions of auxiliary valve plate 111 and main valve plate 93 when the butterfly valve 81 is in the position illustrated in Fig. 9.

Shaft 51 with butterfly valve 81, auxiliary valve plate 111 and main valve plate 93 are stopped in the said closed throttle position by stop lug 63 engaging stop pin 67 and being stopped in the open throttle position by lug 65 engaging stop pin. Lugs 63, 65 may be respectively provided with adjustment screws 129, 131, which may be adjusted for engagement with pin 67 to prevent rotation of shaft 51 to a fully closed throttle position and a fully open throttle position whereby the idling position of butterfly valve 81 and the full throttle position of the butterfly valve and valve plate 93 may be determined. Thus with adjustment screws 129, 131 respectively set for idling speed and for full throttle speed, butterfly valve 81 and main valve 93 are shiftable from and to a substantially open throttle position and to and from an idling position substantially, but not entirely, closed.

In the fully open throttle position, best illustrated in Fig. 9, butterfly valve 81 is disposed substantially longitudinally of air pipe 13 whereby the air flow will be substantially unrestricted by the vanes 81A of butterfly valve 81, shaft 51 providing the only restriction. As illustrated in Fig. 5, main valve plate 93 when in said idling position, covers the major portion of the aperture 101 except for a small portion adjacent apex 107 whereby a small amount of fuel is permitted to pass through the aperture from chamber 19 to chamber 21. When in said substantially open throttle position, as best illustrated in Fig. 11, main valve plate 93 preferably substantially fully uncovers aperture 101. Thus it will be apparent that a main fuel control means comprising a valve plate 93 and a disc 15 having a fuel flow port or aperture 101, is provided for controlling the flow of fuel from header chamber 19 to intermediate chamber 21. Means may be provided for varying the position of aperture 101 relative to shaft 51 whereby to vary the amount of fuel flow through aperture 101 relative to the fuel flow through aperture 127 and the air flow through air pipe 13, at any given instant. Said means may comprise a longitudinally extending lug 132 fixedly attached to the outside of disc 15 and interposed between the ends of inwardly extending screws 133 which are respectively threadedly engaged in threaded apertures in a pair of ears 134 fixedly attached to intermediate casing 41. Thus by adjusting the positions of screws 133 in ears 134 lug 132 may be moved to rotate disc 15 whereby to vary the position of aperture 101 relative to shaft 51.

It will be understood that as valve plate 93 is rotated from said idling position towards the substantially open throttle position the rotation is in a counterclockwise direction as seen and as indicated by the arrow n Fig. 8.

It will be apparent that in moving valve plate 93 relative to fuel flow port 101 in the direction indicated by the arrow in Fig. 8, the length of valve plate edge portion 93 subtended by sides 103, 105 is increased during a major portion of the travel thereof whereby there will be an exponential increase in the amount of the opening of aperture 101 relative to the rotation of shaft 51 and butterfly valve 81 during said major portion, and in moving valve plate 93 in the opposite direction said subtended length is decreased whereby there will be an exponential decrease in the amount of the opening of the aperture, in view of the substantially wedge shape of aperture 101. In other words, as butterfly valve 81 is rotated through a major portion of the travel thereof towards the open throttle position in equal increments, aperture 101 will be opened in progressively increasing increments. Conversely, when butterfly valve 81 is rotated towards the closed throttle position in equal increments, aperture 101 will be closed in progressively decreasing increments. The exponential increase and decrease in the aperture opening substantially throughout a major portion of the length of valve plate movement relative to the aperture 101 is desirable under many conditions of use. It will be observed that movement of plate edge 93A rotationally (in the direction of the arrow of Fig. 8) beyond said major portion into the reduced width terminal section results in a decrease in the subtended length of edge 93A varying the ratio of increase in the area of the exposed port opening.

Under differing conditions of use varying conditions of calibration requirement may be encountered, and under such circumstances the size and shape of flow ports 101, 127 may be varied.

Means for conducting the fuel from a source of supply, not shown, to said carburetor device comprises a fuel line 135 which is coupled to dome 43 and in communication with header fuel chamber 19. It will be understood that the carburetor device of the present invention is particularly adapted for use with fuel of the character of propane-butane or the like, and when the fuel reaches said carburetor device it is in the gaseous state. As in conventional engines using fuel of this type, the fuel may be in the liquid state when in the fuel tank. Thus a liquid fuel, as of the character of liquid petroleum or the like, is introduced into the fuel line system of engine 27 from a fuel tank (not shown) and is in the gaseous state before reaching header fuel chamber 19.

The path of flow of the gaseous fuel after reaching header fuel chamber 19 is through aperture 101 into intermediate chamber 21, thence into the open rod 79 of hollow shaft 51, then through the lower passageway 73 and out through a plurality of lower perforations 136 provided in shaft 51, and into air intake pipe 13. Perforations 136 are preferably longitudinally spaced along the portion of shaft 51 extending through air intake 13. Thus fuel ejection means is provided which will eject fuel into the air stream transversely of air intake pipe 13 and in a direction away from butterfly valve 81 towards intake manifold 25.

In addition to the path of flow hereinabove described for the fuel from intermediate chamber 21 into air pipe 13 a portion of the fuel flows through aperture 127 into auxiliary fuel chamber 23, thence through the cutout portion 77 into upper passageway 71 and out through a plurality of upper perforations 137 provided in shaft 51 and concave portion 83 into air intake pipe 13. Perforations 137 are preferably longitudinally spaced along concave portion 83 and along the portion of shaft 51 extending through air intake pipe 13, the perforation in concave portion 83 being indexed with the ones in shaft 51. Thus fuel ejection means is provided which will eject the fuel into the air stream transversely of air intake pipe 13 and in a direction away from the upper side of butterfly valve 81. A transversely extending shield 139 is preferably provided on butterfly valve 81 adjacent upper perforations 137 along the side thereof which is upstream when butterfly valve 81 is opened. Thus, shield 139 is disposed to deflect the air flowing through air pipe 13 away from upper perforations 131, effecting a restriction of the flow path and enhancing the vacuum effect of such air flow, substantially balancing the similar effect created by the vane of the butterfly valve 81 upstream when thus shifted.

In the operation of the present invention the throttle pedal (not shown) of the engine 27 is actuated so that the throttle pedal acting through the connecting linkages heretofore described is effective to shift lever 59 and rotate shaft 51 to permit sufficient fuel and air to enter the engine for the starting thereof. From the foregoing it will be apparent that the sequence of operation of the butterfly valve 81 and valve plates 93, 111 is as follows: At the beginning of the operation butterfly valve 81 is in the position illustrated in Fig. 3 to substantially close off air pipe 13, auxiliary valve plate 111 is in the position illustrated in Fig. 4 wherein it will be seen the auxiliary valve plate covers aperture 127, and main valve plate 93 is in the position illustrated in Fig. 5 wherein it will be seen the main valve plate uncovers a minor portion of aperture 101. As shaft 51 is rotated in a clockwise direction as viewed in Fig. 3 from the position illustrated therein to the position in Fig. 9 auxiliary valve plate 111, main valve plate 93 and butterfly valve 81 are conjointly rotated therewith. During substantially the first half of this rotation main valve plate 93 exposes a progressively greater portion of aperture 101, auxiliary valve plate 111 moves across aperture 127 without exposing the aperture, and butterfly valve 81 progressively opens air pipe 13 to air flow. As the rotation continues from substantially the half way point onward, main valve plate 93 continues to expose a greater portion of aperture 101, auxiliary valve plate 111 exposes progressively greater portions of aperture 127, and butterfly valve 81 continues to progressively open air pipe 13. It will be understood that as the speed of engine 27 is increased a greater vacuum will be established in intake manifold 25 whereby the volume of air flow through intake pipe 13 will be increased. During the first phase of the operation of the device of the present invention it will be understood that main valve plate 93 will be effective in conjunction with aperture 101, and that auxiliary valve plate 111 will not be effective in conjunction with its related aperture 127, whereby during this first phase of the operation the fuel will flow into the air intake pipe 13 only from lower perforations 136. Also during this phase of operation the exponential increase in the opening of aperture 101 will compensate for the increase in the volume of air flow through air pipe 13 whereby a substantially constant air fuel ratio will be maintained. During the remaining phase of operation of the device, that is, when auxiliary valve plate 111 is effective to open aperture 127, the fuel will additionally flow into air intake pipe 13 through the upper perforations 137. Thus the device of the present invention is effective under load conditions to deliver fuel from both sides of the butterfly valve and to insure full fuel delivery.

It will be seen that the exposure of aperture 127 under shift of valve plate 111 effects flow communication into chamber 23 and thence through opening 77 in the initially uppermost portion 71 of shaft 51 whereby to communicate fuel to apertures 137. It will further be seen that fuel communication to apertures 137 is established only when the shaft and butterfly have been rotated to move apertures 137 toward a downstream position relative to the axis of the shaft.

I claim:

1. In a carburetor device, an air intake pipe, a butterfly valve in said air intake pipe, a hollow shaft journalled in said pipe and supporting said valve for movement to and from a closed position in which said valve substantially closes said pipe against air flow, through an intermediate position in which said butterfly valve is partially open and less than fully open, from and to an open position in which said butterfly valve is fully open and air flow through said pipe is substantially unrestricted by said valve, a baffle extending longitudinally of said shaft and dividing said shaft into first and auxiliary prassageway means, fuel metering means connected with said pipe comprising a fuel receiving header chamber, a flow receiving main chamber, and an auxiliary chamber; means dividing said header chamber from said main chamber comprising an apertured disc and a main valve plate closingly covering the aperture in said disc, said valve plate being shiftable to uncover and cover said aperture to respectively establish and disestablish flow communication between said header chamber and said main chamber, said first passageway means being segregated from said auxiliary chamber apertured adjacent one side of said buterfly valve communicating said main chamber with said air pipe adjacent said one side of said butterfly valve; means dividing said main chamber from said auxiliary chamber comprising a second apertured disc and a second valve plate closingly covering the aperture in said second disc, said second valve plate being shiftable to respectively establish and disestablish flow communication between said main chamber and said auxiliary chamber, said auxiliary passageway means being apertured adjacent the other side of said butterfly valve and communicating said auxiliary chamber with said air pipe adjacent said other side of said butterfly valve; said valve plates being connected to said shaft for conjoint movement with said butterfly valve, said main valve plate being positioned to substantially cover its related disc aperture when said butterfly valve is in said closed position and to progressively uncover said related aperture concurrently with movement of said butterfly valve toward said open position, establishing flow to said butterfly valve one side, said second valve plate being positioned to cover the aperture in said second disc and to maintain aperture closing coverage through a substantial portion of movement of said second valve plate with said butterfly valve movement toward said open position, whereby to maintain disestablishment of fuel flow to said auxiliary chamber and said butterfly valve other side during at least butterfly valve opening movement to said intermediate position, movement of said butterfly valve beyond said intermediate position toward said open position effecting shift of said second valve plate to progressively uncover the aperture in said second disc to establish communication through said auxiliary chamber and said auxiliary passageway means to said butterfly valve other side, whereby to establish fuel flow to said butterfly valve other side at least during a terminal portion of the movement of said butterfly valve to said open position.

2. In a carburetor device, an air intake pipe, a butterfly valve rotatably supported in said air intake pipe for movement to and from a closed position in which said valve substantially closes said pipe against air flow, through an intermediate position in which said butterfly valve is partially open and less than fully open, from and to an open position in which said butterfly valve is fully open and air flow through said pipe is substantially unrestricted by said valve, fuel metering means connected with said pipe comprising a fuel receiving header chamber, a flow receiving main chamber, and an auxiliary chamber; means dividing said header chamber from said main chamber comprising an apertured disc and a main valve plate closingly covering the aperture in said disc, said valve plate being shiftable to uncover and cover said aperture to respectively establish and disestablish flow communication between said header chamber and said main chamber, first passageway means segregated from said auxiliary chamber communicating said main chamber with said air pipe adjacent one side of said butterfly valve; means dividing said main chamber from said auxiliary chamber comprising a second apertured disc and a second valve plate closingly covering the aperture in said second disc, said second valve plate being shiftable to respectively establish and disestablish flow communication between said main chamber and said auxiliary chamber, auxiliary passageway means communicating said auxiliary chamber with said air pipe adjacent the other side of said butterfly valve; and means interconnecting said butterfly valve and said valve plates for conjoint movement, said main valve plate being positioned to substantially cover its related disc aperture when said butterfly valve is in said closed position and to progressively uncover said related aperture concurrently with movement of said butterfly valve toward said open position, establishing flow to said butterfly valve one side, said second valve plate being positioned to cover the aperture in said second disc and to maintain aperture closing coverage through a substantial portion of movement of said second valve plate with said butterfly valve movement toward said open position, whereby to maintain disestablishment of fuel flow to said auxiliary chamber and said butterfly valve other side during at least butterfly valve opening movement to said intermediate position, movement of said butterfly valve beyond said intermediate position toward said open position effecting shift of said second valve plate to progressively uncover the aperture in said second disc to establish communication through said auxiliary chamber and said auxiliary pasageway means to said butterfly valve other side, whereby to establish fuel flow to said butterfly valve other side at least during a terminal portion of the movement of said butterfly valve to said open position.

3. In a carburetor device, an air intake pipe, a butterfly valve rotatably mounted in said air intake pipe for controlling the passage of air therethrough, said valve being shiftable from and to an open position in which said air valve substantially unrestricts the air flow through said air pipe and being shiftable to and from a closed position in which the flow of air through said air pipe is substantially shut off by said valve, a casing assembly mounted on said air intake pipe, said casing assembly including a pair of spaced discs dividing said casing into a header chamber, an intermediate chamber and an auxiliary chamber, fuel supply means communicated with said header chamber for supplying fuel thereto, one of said discs forming the wall between said header chamber and said intermediate chamber, the other of said discs forming the wall between said intermediate chamber and said auxiliary chamber, said one of said discs being cut-out to provide a first aperture communicating said header chamber with said intermediate chamber, a main valve plate rotatably shiftable across said first aperture to establish and vary an exposed portion of the aperture, said other of said discs being cut-out to provide a second aperture communicating said intermediate chamber with said auxiliary chamber, an auxiliary valve plate rotatably shiftable across said second aperture to establish and vary an exposed portion of the aperture, means interconnecting said main valve plate, said auxiliary valve plate, and said butterfly valve for conjoint movement thereof, said main valve plate, said auxiliary valve plate and said butterfly valve being so related that when said butterfly valve is in said closed position said main valve plate and said auxiliary valve plate respectively substantially close said first aperture and said second aperture, and that when said butterfly valve is in said open position said first aperture and said second aperture are respectively exposed by said main valve plate and said auxiliary valve plate, and that when said butterfly valve is substantially half way between said open and closed positions said main valve plate exposes a substantial portion of said first aperture and said auxiliary valve plate exposes a minor portion of said second aperture, a pair of passageway means respectively opening at one end into said air intake pipe adjacent opposite sides of said butterfly valve, one of said passageway means opening at its opposite end into said intermediate chamber, the other of said passageway means opening at its opposite end into said auxiliary chamber, whereby fuel is permitted to flow from said intermediate chamber and said auxiliary chamber into said air intake pipe adjacent opposite sides of said butterfly valve.

4. In a carburetor device, an air intake pipe, a rotatable hollow shaft journalled in said air intake pipe and extending transversely thereof, a baffle plate extending longitudinally of the interior of said hollow shaft to divide the shaft into a longitudinally extending upper passageway and a longitudinally extending lower passageway, a butterfly valve mounted on said shaft in said air intake pipe, said butterfly valve having an upper side and a lower side, said butterfly valve being disposed on the exterior of said shaft substantially in alinement with said baffle plate to divide the shaft into an upper portion adjacent said upper passageway and a lower portion adjacent said lower passageway, said upper portion being bored to provide a plurality of upper perforations communicating said upper passageway with said air intake pipe adjacent the upper side of said butterfly valve, said lower portion being bored to provide a plurality of lower perforations communicating said lower passageway with said air intake pipe adjacent the lower side of said butterfly valve, a casing assembly supported from said air intake pipe, said casing assembly including a header chamber, an intermediate chamber and an auxiliary chamber, fuel supply means connected to said header chamber for introducing fuel therein, main fuel valve means interposed between said header chamber and said intermediate chamber to effect a variable flow of fuel from said header chamber to said intermediate chamber, auxiliary fuel valve means interposed between said intermediate chamber and said auxiliary chamber to effect a variable flow of fuel from said intermediate chamber to said auxiliary chamber, means communicating said auxiliary chamber with said upper passageway whereby fuel is permitted to flow from said auxiliary chamber through said upper passageway through said upper perforations and into said air pipe adjacent the upper side of said butterfly valve, said lower passageway opening into said intermediate chamber whereby fuel is permitted to flow from said auxiliary chamber through said lower passageway, through said lower perforations and into said air pipe adjacent the lower side of said butterfly valve, said main fuel valve and said auxiliary fuel valve being conjointly operable responsive to rotation of said shaft, said auxiliary valve means being arranged to begin opening when said main valve means is substantially one-half opened.

5. In a carburetor device, an air intake pipe, a rotatable hollow shaft journalled in said air intake pipe and extending transversely thereof, a baffle plate extending longitudinally of the interior of said hollow shaft to divide the shaft into a longitudinally extending upper passageway and a longitudinally extending lower passageway, a butterfly valve mounted on said shaft in said air intake pipe, said butterfly valve having an upper side and a lower side, said butterfly valve being disposed on the exterior of said shaft substantially in alinement with said baffle plate to divide the shaft into an upper portion adjacent said upper passageway and a lower portion adjacent said lower passageway, said upper portion being bored to provide a plurality of upper perforations communicating said upper passageway with said air intake pipe adjacent the upper side of said butterfly valve, said lower portion being bored to provide a plurality of lower perforations communicating said lower passageway with said air intake pipe adjacent the lower side of said butterfly valve, a casing assembly supported from said air intake pipe, said casing assembly including a header chamber, an intermediate chamber and an auxiliary chamber, fuel supply means connected to said header chamber for introducing fuel therein, main fuel valve means interposed between said header chamber and said intermediate chamber to effect a variable flow of fuel from said header chamber to said intermediate chamber, auxiliary fuel valve means interposed between said intermediate chamber and said auxiliary chamber to effect a variable flow of fuel from said intermediate chamber to said auxiliary chamber, means communicating said auxiliary chamber with said upper passageway whereby fuel is permitted to flow from said auxiliary chamber through said upper passageway through said upper perforations and into said air pipe adjacent the upper side of said butterfly valve, said lower passageway opening into said intermediate chamber whereby fuel is permitted to flow from said auxiliary chamber through said lower passageway, through said lower perforations and into said air pipe adjacent the lower side of said butterfly valve.

6. In a carburetor device, an air intake pipe, a butterfly valve rotatably supported in said air intake pipe for movement to and from a closed position in which said valve substantially closes said pipe against air flow, through an intermediate position in which said butterfly valve is partially open and less than fully open, from and to an open position in which said butterfly valve is fully open and air flow through said pipe is substantially unrestricted by said valve; fuel metering means connected with said pipe comprising a fuel receiving header chamber, a flow-receiving main chamber, and an auxiliary chamber; flow control means controlling flow from said header chamber to said main chamber, first passageway means segregated from said auxiliary chamber communicating said main chamber with said air pipe adjacent one side of said butterfly valve; additional flow control means controlling flow from said main chamber to said auxiliary chamber, auxiliary passageway means communicating said auxilary chamber with said air pipe adjacent the other side of said butterfly valve; and means interconnecting said butterfly valve and the first said flow control means for conjoint movement, to establish flow to said butterfly valve one side as said butterfly valve is opened, said additional flow control means blocking flow to said auxiliary passageway means through a substantial portion of said butterfly valve movement toward said open position, whereby to maintain disestablishment of fuel flow to said butterfly valve other side during at least butterfly valve opening movement to said intermediate position, said additional flow control means being operably connected with said butterfly valve, movement of said butterfly valve beyond said intermediate position toward said open position effecting movement of said addition flow control means to establish communication through said auxiliary passageway means to said butterfly valve other side, whereby to establish fuel flow to said butterfly valve other side at least during a terminal portion of the movement of said buterfly valve to said open position.

7. In a carburetor device, an air intake pipe, a rotatable hollow shaft journalled in said air intake pipe and extending transversely thereof, a butterfly valve mounted on said shaft in said air pipe for shift toward and away from open position to the volume of air through the air pipe, said shaft being laterally perforated adjacent said butterfly valve to form a plurality of longitudinally spaced perforations communicating said air intake pipe with the interior of said hollow shaft, said perforations being substantially equally spaced apart across said air pipe, fuel chamber means communicating with said shaft and through said shaft and spaced perforations with said air intake pipe, fuel supply means coupled to said fuel chamber means, and fuel control means interposed between said fuel supply means and said chamber means for controlling the flow of fuel into said fuel chamber means, said fuel control means comprising a disc and a valve plate including an edge portion, said disc being cut out to provide a wedge-shaped aperture having a pair of spaced sides, said sides converging into angular intersection at one of their ends to form an apex and extending away from their apex in diverging relationship, said aperture communicating said fuel supply means with said chamber means, said valve plate being connected to said shaft and shiftable thereby across said aperture to establish and vary an exposed portion of the aperture, shift of said plate respectively in a direction away from said apex and in a direction towards said apex being effective to move said edge portion in a path relative to said sides to respectively increase and decrease the length of the edge portion subtended by said sides as the distance of the edge portion from said apex increases and decreases whereby the area of said exposed portion is increased in increasing increments and decreased in decreasing increments relative to the rotation of said shaft, rotation of said shaft being effective to conjointly rotate said butterfly valve and shift said plate, shaft rotation to effect shift of said plate away from said apex rotating said butterfly valve toward open position.

8. In a carburetor device, an air intake pipe, a butterfly valve supported in said pipe, a rotatable hollow shaft journalled in said air intake pipe and extending transversely thereof, said shaft being laterally perforated adjacent said butterfly valve to form a plurality of longitudinally spaced perforations communicating said air intake pipe with the interior of said hollow shaft, fuel chamber means communicating with said shaft and through said shaft and perforations with said air intake pipe, fuel supply means coupled to said fuel chamber pipe, and fuel control means interposed between said fuel supply means and said chamber means for controlling the flow of fuel into said fuel chamber means, said fuel control means comprising a disc and a valve plate including an edge portion, said disc being cut out to provide a wede-shaped aperture having a pair of spaced sides, said sides converging into angular intersection at one of their ends to form an apex and extending away from their apex in diverging relationship to define an aperture communicating said fuel supply means with said chamber means, said valve plate being connected to said shaft and shiftable thereby across said aperture to establish and vary an exposed portion of the aperture, shift of said plate respectively in a direction away from said apex and in a direction towards said apex being effective to move said edge portion in a path relative to said sides to respectively increase and decrease the length of the edge portion subtended by said sides as the distance of the edge portion from said apex increases and decreases whereby the area of said exposed portion is increased in increasing increments and decreased in decreasing increments relative to the rotation of said shaft.

9. In a carburetor device, an air intake pipe, a casing assembly supported from said air intake pipe, said casing assembly including fuel chamber means, fuel supply means communicable with said fuel chamber means, a rotatable hollow shaft journalled in said air pipe, said shaft having an open end and a closed end, said open end opening into said fuel chamber means, said shaft being perforated on the downstream side thereof in said air intake pipe whereby said chamber means is in communication with said air intake pipe through said shaft, fuel control means interposed between said fuel supply means and said fuel chamber means for establishing and regulating the flow of fuel from said fuel supply means to said fuel chamber means, said fuel control means comprising a disc and valve plate means, said disc being cut out to provide a wedge-shaped aperture communicating said fuel supply means with said fuel chamber means, said valve plate means being longitudinally shiftably mounted on said shaft for longitudinal shift of said valve plate means relative to said shaft, spring means interposed between said casing and said valve means to urge the valve means against said disc, said shaft engaged adjacent the distal end thereof with said valve plate means to shift said valve plate means across said aperture to establish and vary an exposed portion of the aperture, and a butterfly valve mounted on said hollow shaft in said air intake pipe for controlling the flow of air therethrough, whereby rotation of said hollow shaft is effective to conjointly control flow of fuel and air through said air intake pipe.

10. In a carburetor device for gaseous fuel, an air intake pipe, a casing assembly supported from said air intake pipe, said casing assembly including fuel chamber means, fuel supply means communicable with said fuel chamber means, a rotatable hollow shaft journalled in said air pipe, said shaft having an open end and a closed end and being unobstructed from end to end for fuel flow therethrough in a gaseous state, said open end opening into said fuel chamber means, said shaft being perforated to provide a plurality of perforations on the downstream side thereof in said air intake pipe whereby said chamber means is in communication with said air intake pipe through said shaft, said perforations being substantially equally spaced apart along said shaft across said air pipe to provide means for substantially uniform fuel delivery transversely of said air pipe, fuel control means interposed between said fuel supply means and said fuel chamber means for establishing and regulating the flow of fuel from said fuel supply means to said fuel chamber means, said fuel control means comprising a disc and a valve plate, said disc being cut out to provide a wedge-shaped aperture communicating said fuel supply means with said fuel chamber means, said valve plate being connected to said shaft and shiftable thereby across said aperture to establish and vary an exposed portion of the aperture, and a butterfly valve mounted on said hollow shaft in said air intake pipe for controlling the flow of air therethrough, whereby rotation of said hollow shaft is effective to conjointly control flow of fuel and air through said air intake pipe.

11. In a carburetor device, an air intake pipe, a butterfly valve rotatably supported in said pipe, fuel chamber means carried by said pipe and including a head chamber, an intermediate chamber and an auxiliary chamber, fuel supply means connected to said head chamber, said intermediate chamber segregating said auxiliary chamber from said head chamber, means controllably communicating said intermediate chamber with said head chamber comprising a fixed apertured disc and a valve plate slidable relative to the aperture in said disc, shift of said plate varying the exposure of said aperture to vary the volume of flow between said head chamber and said intermediate chamber, passageway means communicating said intermediate chamber with said air pipe adjacent one side of said butterfly valve, shiftable means substantially completely blocking fuel flow from said intermediate chamber to said auxiliary chamber, additional passageway means segregated from said intermediate chamber and communicating said auxiliary chamber with said air pipe adjacent the other side of said butterfly valve, means interconnecting said butterfly valve, said valve plate and said fuel flow blocking means for conjoint shifting movement, said blocking means maintaining blocking of fuel flow to said auxiliary chamber during a substantial portion of the opening movement exposing the first said aperture to permit fuel flow only into said intermediate chamber and thence to said air pipe adjacent said one side of said butterfly valve, said blocking means being moved to unblock fuel flow to said auxiliary chamber during continuation of said opening movement to establish communication between said intermediate and auxiliary chambers and additional contemporaneous fuel flow from said auxiliary chamber to said air pipe adjacent said other side of said butterfly valve.

12. In a carburetor device, an air intake pipe, a butterfly valve rotatably supported in said pipe, fuel chamber means carried by said pipe and including a head chamber, an intermediate chamber and an auxiliary chamber, fuel supply means connected to said head chamber, said intermediate chamber segregating said auxiliary chamber from said head chamber, means controllably communicating said intermediate chamber with said head chamber comprising a fixed apertured disc and a valve plate slidable relative to the aperture in said disc, shift of said plate varying the exposure of said aperture to vary the volume of flow between said head chamber and said intermediate chamber, passageway means communicating said intermediate chamber with said air pipe adjacent one side of said butterfly valve, additional apertured disc means dividing said auxiliary chamber from said intermediate chamber, an auxiliary valve plate slidable relative to the aperture in said additional disc, shift of said auxiliary plate varying the exposure of the additional disc aperture to control communication between said intermediate and auxiliary chambers, additional passageway means segregated from said intermediate chamber and communicating said auxiliary chamber with said air pipe adjacent the other side of said butterfly valve, means interconnecting said butterfly valve and said valve plates for conjoint shifting movement, said valve plates being positioned relative to the respective said apertures so that said additional disc aperture is covered during a substantial portion of the opening movement exposing the first said aperture to permit fuel flow only into said intermediate chamber and thence to said air pipe adjacent said one side of said butterfly valve, said additional disc aperture being exposed during continuation of said opening movement to establish communication between said intermediate and auxiliary chambers and additional fuel flow from said auxiliary chamber to said air pipe adjacent said other side of said butterfly valve.

13. In a carburetor device, an air intake pipe, a fuel chamber means communicating with said air intake pipe, fuel supply means coupled to said fuel chamber means, and fuel control means interposed between said fuel supply means and said chamber means for controlling the flow of fuel into said fuel chamber means, said fuel control means comprising a disc and a valve plate including an edge portion, said disc being cut out to provide a wedge-shaped aperture having a pair of spaced sides, said sides converging into angular intersection at one of their ends to form an apex and extending away from their apex in diverging relationship to define an aperture communicating said fuel supply means with said chamber means, means connected to said valve plate for shifting said valve plate across said aperture to establish and vary an exposed portion of the aperture, shift of said plate respectively in a direction away from said apex and in a direction towards said apex being effective to move said edge portion in a path relative to said sides to respectively increase and decrease the length of the edge portion subtended by said sides as the distance of the edge portions from said apex increases and decreases whereby the area of said exposed portion is increased in increasing increments and decreased in decreasing increments relative to the shift of said plate.

14. In a carburetor device for gaseous fuel, an air intake pipe, a casing assembly supported from said air intake pipe, said casing assembly including fuel chamber means, fuel supply means communicable with said fuel chamber means, a shaft journalled in said air pipe, means communicating said chamber means with said air intake pipe for substantially uniform fuel delivery transversely of said air pipe, fuel control means interposed between said fuel supply means and said fuel chamber means for establishing and regulating the flow of fuel from said fuel supply means to said fuel chamber means, said fuel control means comprising a disc and a valve plate, said disc being cut out to provide a wedge-shaped aperture communicating said fuel supply means with said fuel chamber means, said valve being connected to said shaft and shiftable thereby across said aperture to establish and vary an exposed portion of the aperture, and a butterfly valve mounted on said shaft in said air intake pipe for controlling the flow of air therethrough, whereby rotation of said shaft is effective to conjointly control flow of fuel and air through said air intake pipe.

15. In a carburetor device for gaseous fuel, an air intake pipe, a casing assembly supported from said air intake pipe, said casing assembly including fuel chamber means, fuel supply means communicable with said fuel chamber means, a rotatable shaft journalled in said air pipe, means communicating said chamber means with said air intake pipe, fuel control means interposed between said fuel supply means and said fuel chamber means for establishing and regulating the flow of fuel from said fuel supply means to said fuel chamber means, said fuel control means comprising a disc and a valve plate, said disc being cut out to provide a wedge-shaped aperture communicating said fuel supply means with said fuel chamber means, said valve being connected to said shaft and shiftable thereby across said aperture to establish and vary an exposed portion of the aperture, and a butterfly valve mounted on said shaft in said air intake pipe for controlling the flow of air therethrough, whereby rotation of said shaft is effective to conjointly control flow of fuel and air through said air intake pipe.

References Cited in the file of this patent

UNITED STATES PATENTS

| | | |
|---|---|---|
| 1,068,349 | Lane et al. | July 22, 1913 |
| 1,130,103 | Plumm | Mar. 2, 1915 |
| 1,425,256 | Blanchard | Aug. 29, 1922 |
| 1,520,926 | Brown | Dec. 30, 1925 |
| 1,616,726 | Wilcox | Feb. 8, 1927 |
| 2,584,911 | Orr | Feb. 5, 1952 |
| 2,638,330 | Morgenroth | May 12, 1953 |
| 2,734,529 | Harrison | Feb. 14, 1956 |